United States Patent [19]

Wolters

[11] Patent Number: 4,479,229

[45] Date of Patent: Oct. 23, 1984

[54] ARRANGEMENT FOR AND METHOD OF DETECTING MULTI-FREQUENCY SOUND CODE SIGNALS

[75] Inventor: Gerardus A. M. Wolters, Lith, Netherlands

[73] Assignee: U.S. Philips Corporation, New York, N.Y.

[21] Appl. No.: 452,567

[22] Filed: Dec. 23, 1982

[30] Foreign Application Priority Data

Jan. 8, 1982 [NL] Netherlands ............................. 8200051

[51] Int. Cl.$^3$ ................................................ H04L 5/06
[52] U.S. Cl. .................................... 375/89; 340/825.74; 364/827
[58] Field of Search ....................... 375/82, 89, 96, 103, 375/104, 38, 40; 364/485, 514, 572, 576, 604, 724, 726, 827; 370/23; 343/5 FT, 5 SA; 340/825.74, 825.73; 179/84.55; 455/59

[56] References Cited

U.S. PATENT DOCUMENTS 3,104,393  9/1963  Vogelman ............................ 375/38
3,710,257  1/1973  Low et al. ........................... 455/59
3,810,019  5/1974  Miller ................................. 375/38

*Primary Examiner*—Robert L. Griffin
*Assistant Examiner*—Stephen Chin
*Attorney, Agent, or Firm*—Thomas A. Briody; William J. Streeter

[57] ABSTRACT

A multi-frequency signal receiver for use in telephony signalling systems comprises a plurality of frequency selective circuits whose outputs are connected to a signal combination detector which produces a code at its output which depends on the signals passed by the frequency selective circuits.

A guard circuit is provided to inhibit the output of the signal combination detector. The guard circuit determines the total received power and compares this with the power of two strongest multi-frequency signals received in order to decide whether the detected signal is valid. The guard circuit also includes a comb filter having maximum attenuation at the frequencies to which the frequency selective circuits are sensitive and minimum attenuation half way between the frequencies to which two successive frequency selective circuits are tuned. If the power passed by the comb filter is greater than a predetermined value the output of the signal combination detector is inhibited. This prevents a single frequency large amplitude signal located mid way between two successive signalling frequencies from activating the receiver.

1 Claim, 6 Drawing Figures

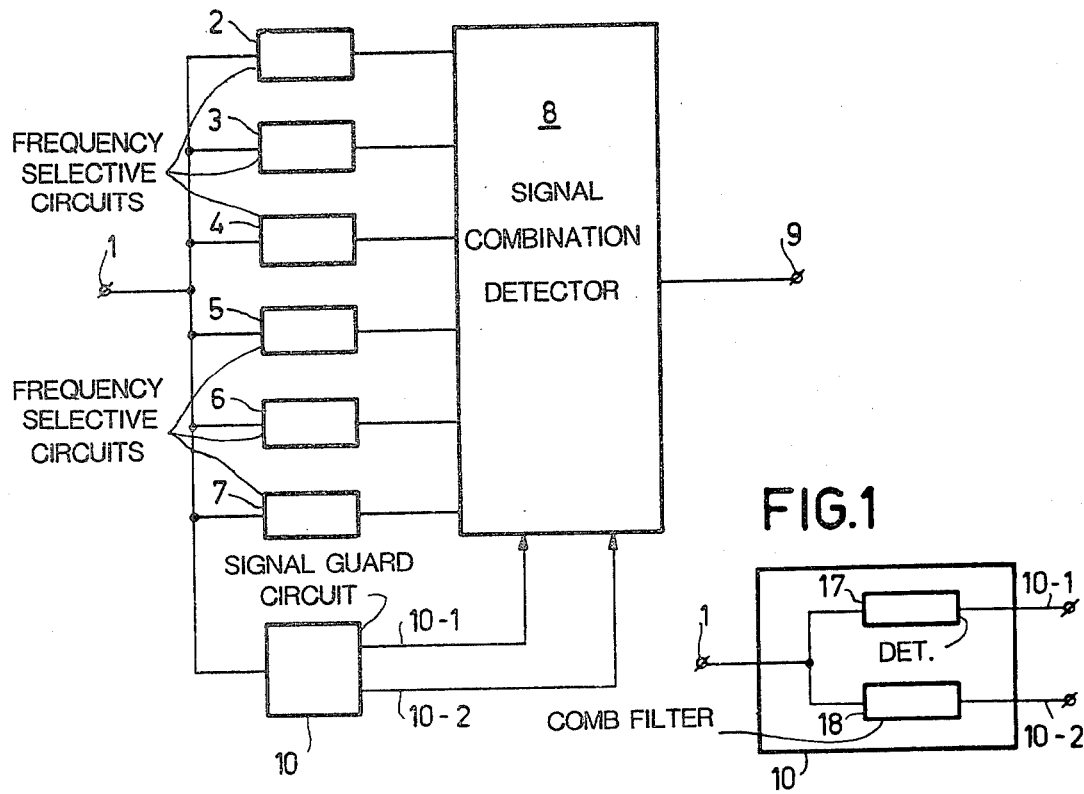
FIG.1
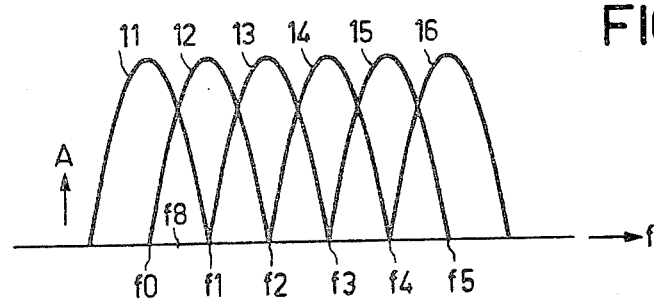
FIG.3
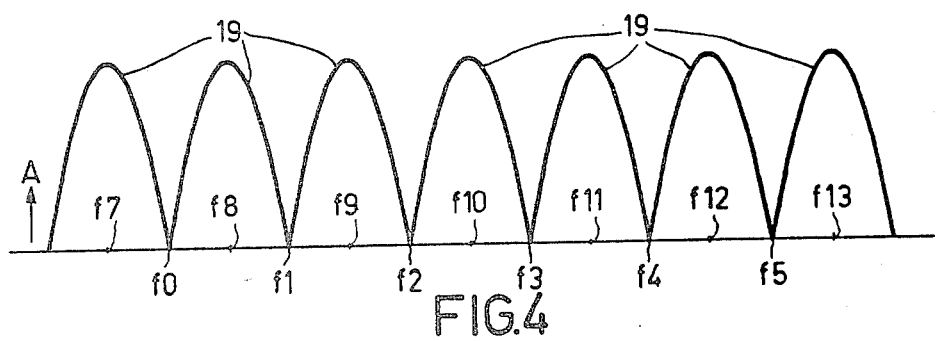
FIG.2
FIG.4

4,479,229

ARRANGEMENT FOR AND METHOD OF DETECTING MULTI-FREQUENCY SOUND CODE SIGNALS

The invention relates to a method for use in a multi-frequency signal receiver for detecting in digital input signals combinations of at least two signals out of a group of multi-frequency signals and for determining by means of a comb filter whose zero points in its transfer characteristics substantially coincide with the nominal frequencies of the group of multi-frequency signals whether the receiver erroneously responds to a single frequency signal.

BACKGROUND OF THE INVENTION

Multi-frequency signal receivers are frequently used in telephony systems, particularly with multi-frequency register signalling for the detection of both analog signals and digital signals, which signals may be derived from analog signals, possibly by sampling and analog-to-digital conversion. Such a multi-frequency signal receiver arranged for the detection of digital signals is disclosed in the article "Digital MF Receiver Using Discrete Fourier Transform" by I-Koval and G. Gara, published in IEEE Transactions on Communications, vol. COM-21 No. 12, December 1973, pages 1331–1335.

The frequencies of the said signalling type are located within the audio band. Thus, it is possible that interfering signals located in the audio band, such as noise and other unwanted signals, simulate signal combinations. So as to distinguish between the reception of a valid signal combination or the reception of interfering signals these receivers are provided with an interfering signal guard circuit.

Thus, the interfering signal guard circuit in the multi-frequency signal receiver disclosed in the above-mentioned article determines the total received power and compares this with the power of the two strongest received signals in order to determine whether the detected signal combination is valid.

On the occurence of an interfering signal consisting of a single frequency signal, whose frequency is located approximately halfway between two consecutive signal frequencies the two frequency-selective elements which are sensitive to the two signals will respond and the interfering signal guard circuit will not detect any other power than the power detected in the said two frequency-selective elements. Consequently, this multi-frequency signal receiver will not recognize as a valid signal combination a signal combination simulated by a single frequency signal.

To obviate this it is known from French Patent Specification No. 2,455,405 to use comb filters whose zero points in their transfer characteristics substantially coincide with the nominal frequencies of the group of multi-frequency signals. As the addition of a comb filter function increases the detection period as the processing period is increased, or additional or faster components are required, it is known from the French Patent Specification to calculate the comb filter function simultaneously with the signal frequencies by utilizing the side lobes of the filter transfer characteristic. This results however in a coupling between the audio signal detection function and a single frequency interfering signal detection.

OBJECT OF THE INVENTION

It is an object of the invention to provide a multi-frequency signal receiver wherein the said coupling between the audio signal detection and the interfering signal detection is prevented from occurring without the need for a long detection period or the use of additional equipment.

SUMMARY OF THE INVENTION

According to the invention, a method of the type set forth in the opening paragraph, is characterized by the following steps:

determining the discrete Fourier transform of the digital input signals, having as Kernels of this discrete Fourier transform the expressions:

$$\sum_{k=0}^{k=p} w(n,T) \cdot (-1)^k \cdot \sin[2\pi(f_o - \delta f/2 + k\delta f)nT] \text{ and}$$

$$\sum_{k=0}^{k=p} w(n,T) \cdot (-1)^k \cdot \cos[2\pi(f_o - \delta f/2 + k\delta f)nT]$$

where $w(n,T)$ is a predetermined window signal, p the number of multi-frequency signals, $f_o$ the lowest multi-frequency signal frequency from the group of multi-frequency signals, $\delta f$ is the frequency difference between two frequency-sequential multi-frequency signals, T is the period of time located between two consecutive samples of the digital input signals, and n is the number of the samples of the input signals;

determining from the discrete Fourier transformed input signals a signal which is proportional to the power of the selected frequency component;

comparing this signal with the sum of the powers of the multi-frequency signals of a detected multi-frequency signal combination; and invalidating the detected multi-frequency code signal combination when the said signal has a value which exceeds a threshold value dependent on the value of the said sum.

The advantage of this method of determining a single sinusoidal signal is that a prior art digital multi-frequency signal receiver can be used with very little additional circuitry or additional calculating time required.

BRIEF DESCRIPTION OF THE DRAWINGS

Embodiments of the invention and their advantages will now be described by way of example, with reference to the accompanying drawings, in which:

FIG. 1 shows a block schematic form first embodiment of a multi-frequency signal receiver;

FIG. 2 shows the transfer characteristic of the frequency-selective elements shown in FIG.°1;

FIG. 3 is a block-schematic diagram of the speech guard circuit of FIG. 1;

FIG. 4 shows the transfer characteristic of the comb-frequency selective element shown in FIG. 3;

Corresponding components in the different Figures of the accompanying drawings have been given the same reference numerals.

DETAILED DESCRIPTION OF THE PREFERRED EMBODIMENTS

Figure 5:
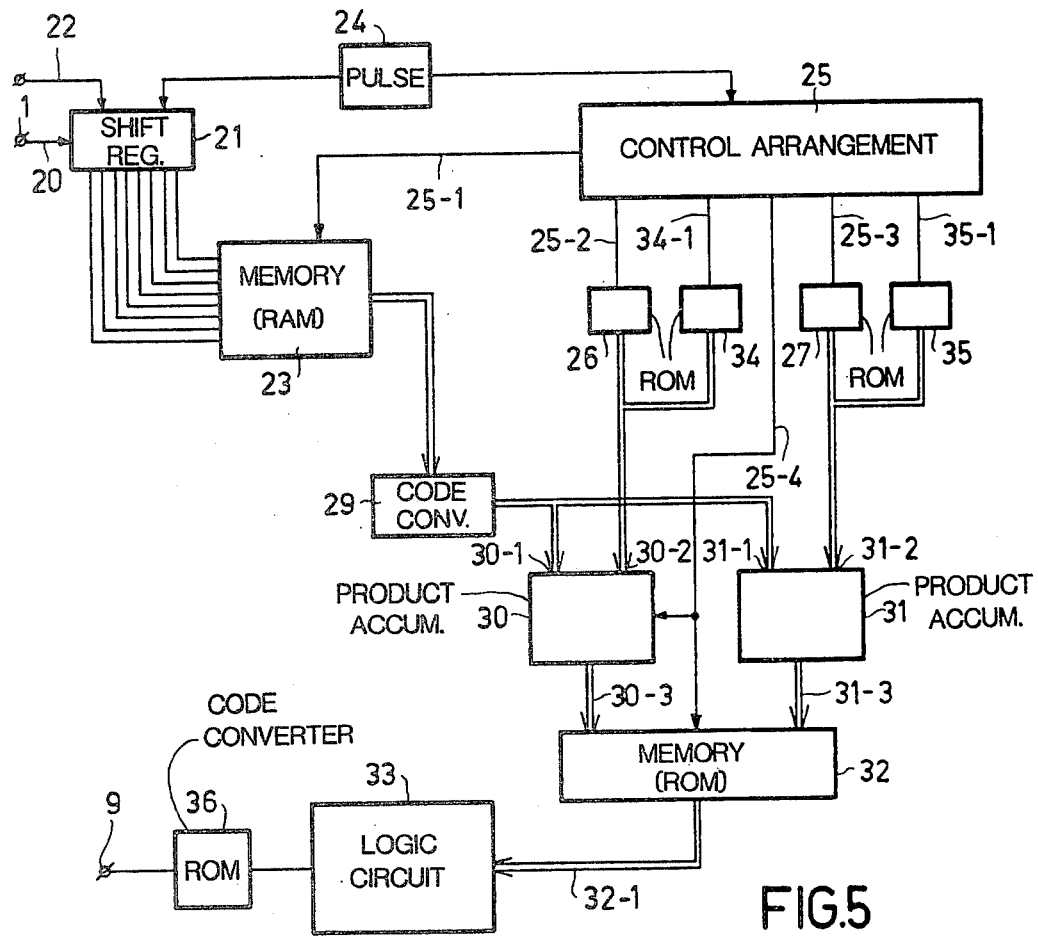
FIG. 5 shows in block schematic form a second digital embodiment of a multi-frequency signal receiver in accordance with the invention.

The multi-frequency signal receiver shown in FIG. 1 may be used to detect multi-frequency register signals between telephone exchanges. These signals are referred to hereinafter as MFC signals. For each transmission direction this MFC register signalling utilizes combinations of two out of a group of six signals located in the audio band for the transmission of signalling information.

Thus, for the transmission in one direction the group of MFC signals of 700, 900, 1100, 1300, 1500 and 1700 Hz may be used, and for the transmission in two directions a compelled signalling with in the forward direction the group of MFC signals of 1380, 1500, 1620, 1740, 1860, 1980 Hz and in the return direction the group of MFC signals of 1140, 1020, 900, 780, 660 and 540 Hz may be used.

To enable the MFC signals to be detected the receiver comprises six frequency-selective circuits 2 to 7, inclusive which are connected to the input 1, each being sensitive to a different MFC signal frequency located in one of the said groups. So as to determine whether the signal detected by the frequency-selective circuits contain an MFC signal a signal combination detector 8 is connected to the frequency selective circuits 2 to 7, inclusive. In a manner known per se this detector applies the associated code sign to output 9, when output signals of only two of these components occur with sufficient energy content.

Since the MFC signals are located in the audio band, the receiver also includes an interfering signal guard circuit 10 to prevent these signals from being simultaneously by noise signals.

The guard circuit 10 determines, for example, the total quantity of received energy. This information is applied via a conductor 10-1 to the MFC signal combination detector 8 where it is compared in known manner with the energy content of the detected MFC signal combination.

If the energy detected by the circuit 10 exceeds the energy of the MFC signals by a predetermined amount then the code sign associated with the detected MFC signal combination is not applied to output 9.

In FIG. 2, the transfer characteristics, 11 to 16 inclusive, of the frequency-selective components, 2 to 7 inclusive, are plotted against the frequency; f0 to f5 inclusive being the six MFC signal frequencies of one of the said group of MFC signals.

If sufficiently strong, single frequency sinusoidal signal having a frequency which is located substantially halfway between two consecutive MFC signal frequencies is received, then the frequency-selective circuits sensitive to those two consecutive MFC signal frequencies will respond. Thus, for the single frequency sinusoidal signal having frequency f8 shown in FIG. 2, the circuits 2 and 3 which are responsive to the MFC signal frequencies F0 and F1 will respond and consequently a signal combination will be detected which is simulated by an interfering signal having frequency f8.

In that case, the interfering signal guard circuit 10 detects no energy content other than the energy content detected by the circuits 2 and 3 and will consequently not prevent the simulated MFC signal combination from being applied to output 9.

In order to reduce this problem, the interfering signal guard circuit 10 as shown in FIG. 3 comprises, in addition to a detector 17 which determines the energy content of all received signals, a comb-frequency selective circuit 18. The transfer characteristic 19 of this comb-frequency selective circuit 18 is shown in FIG. 4. This transfer characteristic has zero points or points of maximum attenuation located at the MFC signal frequencies and has maxima or points of minimum attenuation for frequencies located halfway between the MFC signal frequencies. Consequently, such a comb-frequency selective circuit is particularly suitable for detecting one single sinusoidal signal having a frequency located substantially halfway between two consecutive MFC signal frequencies. On receipt of such a signal the comb-frequency selective circuit produces a maximum output signal. Thus, FIG. 4 shows a maximum signal transmission for the single signal frequency f8.

The output signal of the comb-frequency selective circuit 18 is applied to MFC signal combination detector 8 via conductor 10-2. If the energy of this output signal exceeds a threshold which is derived from the energy content of a detected MFC signal, then the code sign associated with the detected MFC signal combination is prevented from being applied to output 9. In this way, MFC frequency signal combinations which are simulated by single frequency signals are prevented from being validated.

A multi-frequency signal receiver arranged for processing pulse code modulated signals is shown in FIG. 5. This receiver is connected to a multiplex channel 20 having, for example, a data rate of 2.048 megabits per second, distributed over 32 subchannels each of 64 kilobits per second. PCM-modulated MFC signalling is applied to the receiver for each of the subchannels in 8 bit words, each 8 bit word presenting a signal sample, the signal samples having a repetition rate of 8K samples per second.

The operation of the receiver will now be further described with reference to signals applied to the receiver via one subchannel. The processing of the signals of the other channels is effected in an identical manner and may either be effected time-sequentially in the same receiver or in a plurality of parallel-arranged receivers. Alternatively, a combination of parallel and serial processing may be used.

The eight bits of each signal sample from an incoming subchannel are read in a buffer stage in the form of a shift register 21 under the control of a clock signal derived from the signals on the multiplex channel 20 and applied over the line 22. After receipt of a group of 8 bits, this group is written in parallel form into a memory device 23, which memory device may be in the form of a RAM, under the control of a pulse signal produced by a pulse signal arrangement 24. The received samples are written cyclically into this memory.

In practice it has been found that for the determination of the discrete Fourier transform, designated DFT, 128 samples of a received MFC signal forms a good compromise between the detection period, which because of the time $T=125$ $\mu$sec between consecutive samples is then equal to $128.T=16$ msec, the width of the main lobe of the transfer characteristic of the detector required to enable the determination of the individual MFC signals and the power of the detected signal while still being able to distinguish it from noise-speech or other interfering signals having a permissible maximum level prescribed by the administration. Consequently, the number of samples stored in the RAM 23 is chosen to be equal to 128. A subsequently received sample is written over the information of the first sample written in the RAM 23, etc. so that 128 samples are stored before the first one is written over.

The receiver further comprises a control device 25, for example a programmable memory "PROM" as described in the German Auslegeschrift No. 26 03 270, or a portion of a μ processor, for example a Zilog Z 80. The control program stored therein controls inter alia programmable memories PROM 26 and PROM 27 connected to this μ processor in which the respective kernels of the DFT (a) w(nT)·sin (kwnT) and
(b) w(nT)·cos (kwnT)

as defined in IEEE Transactions on Communications Vol. COM-21, No. 12, December 1973, pages 1331–1335, are stored.

In these expressions (a) and (b) defining the kernels of the DFT, T is the time between successive samples, which is 125 μsec in this embodiment, n=1, 2, ... N indicates the number of the sample, N in this embodiment being equal to 128, k is an integer, in this example 0, 1, 2, to 6, inclusive, w is the audio frequency sampling interval equal to $2\pi/NT$, so that kw for the running parameter k represents the MFC frequencies, and w(nT) is a window function. Window functions are used to improve the ratio of the energy of the detector response to the main lobe to the detector response to the side lobes. Such window functions are extensively described in the article "On the use of windows for harmonic analysis with the Discrete Fourier Transform" by F. J. Harris published in Proc. of the IEEE, Vol. 66, No. 1, January 1978, pages 51–83.

For the detection of the MFC signals the what are commonly referred to as "raised-cosine" window functions are particularly suitable.

In order to determine the sums $$S(k,w) = \sum_{n=0}^{n=127} f(n,T) \cdot w(nT) \cdot \sin(kwnT) \text{ and}$$

$$C(k,w) = \sum_{n=0}^{n=127} f(n,T) \cdot w(nT) \cdot \cos(kwnT)$$

the receiver comprises two product accumulators 30 and 31.

In response to the pulse train applied by the pulse arrangement 24 to control arrangement 25 the programm stored in the control arrangement 25 is executed every 125 μsec.

This control arrangement gives the instruction via control conductor 25-1 to read the input samples stored in the arrangement 23 in six consecutive time intervals each having a length of 125 μsec. These samples are applied to first inputs 30-1 and 31-1 of the product accumulators 30 and 31 via a code converter 29 which converts the PCM-coded signal samples into linear binary coded signal samples.

Simultaneously, the control arrangement 25 instructs the arrangements 26 and 27, via the control conductors 25-2 and 25-3 respectively to apply, synchronously with the read input signal samples, the samples of the six different kernels of the MFC signals in six consecutive intervals, each interval having a specific MFC signal assigned to it, to a second input 30-2 of product accumulator 30 and to a second input 31-2 of the product accumulator 31 respectively.

The sums S(k,w) and C(k,w), where k=0, 1, ... 5 for interval 0, 1, 2, ... 5, determined by the product accumulators 30 and 31 are applied as address signals to a memory device ROM 32 via conductors 30-3 and 31-3. For all possible values of the signals S(k,w) and C(k,w) the amplitude associated with the selected frequency component or the power $F(k,w) = F(k,w)^2 = S(k,w)^2 + C(k,w)^2$ is stored in this memory, F(k,w) being the DFT of the input signals f(nT) for the frequency component kw.

The output signals thus obtained which are representative of the power of the received MFC signal frequency are applied via conductor 32-1 to a logic circuit 33 in which they are selected according to magnitude. This circuit, which is known from the above-mentioned article by G. Gara published in IEEE Trans. on Comm. Vol. COM-21, no. 12, December 1973, may for example be realised by means of a μ processor, such as by a portion of the above mentioned Zilog Z80.

The two signal frequencies having the greatest amplitude are then representative of a received MFC signal. In addition to MFC signal detection in the 6 consecutive intervals the total received signal energy is determined in the subsequent 125 μsec interval, to guard against interfering signals.

For this purpose, after the MFC signal detection has ended, the control arrangement 25 gives via conductor 25-1 the instruction to arrangement 23 to read once again the stored input samples. Simultaneously, control conductor 25-4 instructs the product accumulator 30 to apply the input signal samples f(nT) received on the inputs 30-1 internally also to the input 30-2.

The product accumulator 30 determines from the input signal samples the sum signal $$\sum_{n=0}^{N-1} f^2(nT)$$

which is applied as an address signal, optionally compressed, to the arrangement 32. The normalized signal value $$\frac{1}{N} \sum_{n=0}^{N-1} f^2(nT)$$

is stored in this arrangement for all the values of the signal $$\sum_{n=0}^{N-1} f^2(nT)$$

which signal value is applied to the logic circuit 33 under the control of a signal present on conductor 25-4. This logic circuit compares this signal with the sum of the two strongest detected MFC signals, the MFC signal combination being declared valid only when these signals do not differ from each other by more than a predetermined small value.

This prior art MFC signal receiver comprising the above-described interfering signal guard circuit is, however, not capable of recognizing a simulation of an MFC signal combination by a single sinusoidal interfering signal. To render such a recognition possible the receiver comprises a comb filter, as known per se from the French Patent Specification No. 2,455,405.

To recognize an input signal formed by a single sinusoidal signal located approximately halfway between two MFC signal frequencies it would be necessary to determine the DFT for the frequencies f7 to f11 inclusive, located halfway between the MFC frequencies f0 to f5 inclusive in accordance with the comb filter transfer characteristic shown in FIG. 4.

The total number of operations required, that is the determination of six DFT's to enable each of the MFC signal frequencies to be detected increased by one operation for the determination of the total received power, would then be increased by seven DFT's to enable each of the signals located halfway between the MFC signal frequencies to be detected.

To render it possible to perform this number of operations every millisec. i.e. 8 multiplied by 125 μsec, either the processing rate must be approximately doubled, which would require faster and consequently more expensive electronics, or a parallel operation would be required, which would mean doubling the number of components.

The total number of operations required can be reduced as follows. The DFT of each of the frequencies f(7) to f(11) inclusive, is given by $$F(k,w') = \sum_{n=0}^{N-1} f(n \cdot T) w(n,T) \cos[2\pi(fo - \delta f/2 + k\delta f) \cdot nT] +$$
$$j \sum_{n=0}^{N-1} f(n \cdot T) w(n,T) \sin[2\pi(fo - \delta f/2 + k\delta f) \cdot nT]$$

but for a standardization factor, which for the sake of simplicity is chosen to be equal to unity, but which usually is equal to 2/N, wherein fo is the lowest MFC signal frequency, which is 700 Hz for transmission in one direction and for two way transmission is 1380 Hz for the forward direction and 540 Hz for the return direction, δf is the difference between two consecutive MFC signal frequencies, which for transmission in one direction is 100 Hz and for two-way transmission is 120 Hz, and k is the number of MFC signal frequencies. Summation over k results in $$F(w')_{tot} = \sum_{k=0}^{6} F(k,w') =$$

$$\sum_{k=0}^{6} \sum_{n=0}^{N-1} f(nT)w(n,T)\cos[2\pi/fo - \delta f/2 + k\delta f)n \cdot T] +$$

$$j \sum_{k=0}^{6} \sum_{n=0}^{N-1} f(nT)w(n,T)\sin[2\pi(fo - \delta f/2 + k\delta f) \cdot NT].$$

From this it is apparent that the sums over k and over n may be interchanged so that it holds that $$F_{tot}(w') = \sum_{k=0}^{6} f(k,w') =$$

$$\sum_{n=0}^{N-1} f(nT) \sum_{k=0}^{6} W(n,T)\cos[2\pi(fo - \delta f/2 + k\delta f) \cdot nT] +$$

$$j \sum_{n=0}^{N-1} f(nT) \sum_{k=0}^{6} W(n,T)\sin[2\pi(fo - \delta f/2 + k\delta f) \cdot nT].$$

The portions $$\sum_{k=0}^{6} w(nT)\sin[2\pi(fo - \delta f/2 + k\delta f) \cdot nT] \text{ and}$$

$$\sum_{k=0}^{6} w(nT)\cos[2\pi(fo - \delta f/2 + k\delta f) \cdot nT]$$

may be considered as the kernels of one DFT effected over the sum of 6 terms.

Instead of 7 additional calculations, namely one for each signal located halfway between the MFC signal frequencies, only one additional DFT calculation is required. This simplification is based on the recognition of the fact that we want to determine only one unwanted sinusoidal signal frequency by means of the comb filter. The presence of more than two unwanted signal components, being the number of MFC frequency signals in a MFC signal combination, is guarded by the detection of the total received power.

The number of additional calculations required for the detection of one single sinusoidal signal can be still further reduced in a preferred method. As mentioned already earlier in this description, with a DFT the width of the main lobe of the detection response depends on the number of samples which are summed in the DFT calculations. As shown in FIG. 4, the main lobes of the comb filter are half as wide as those of the individual MFC signal frequencies shown in FIG. 2. This would require approximately twice as many input samples, which would not only require much storage capacity but also a double interval of 125 μsec. However, the number of samples can be reduced by approximately 50% and the calculation be effected in only one interval without reducing the selectivity of the filter. This is accomplished by alternately adding together and subtracting from each other with increasing frequencies the transfer characteristics of the DFT's determined by the frequency signals located halfway between the MFC signal frequencies.

Instead of the above derived expression $$\sum_{k=0}^{6} F(k,w')$$

the expression $$\sum_{k=0}^{6} (-1)^k F(k,w')$$

is determined.

In a corresponding manner this yields the expression $$F_t(w) = \sum_{k=0}^{6} (-1)^k F(k,w') = \qquad (1)$$

$$\sum_{n=0}^{(N-1)} f(nT)[r(n,T,k',w') + js(n,T,k',w')]$$

The kernels r(nT,k',w') and s(nT,k',w') have the following shapes $$s(n,T,k',w') = \pm \sum_{k=0}^{6} (-1)^k w(nT) \cdot \sin[2\pi(fo - \delta f/2 + k\delta f) \cdot nT] \qquad (2)$$

and $$r(n,T,k',w') = \pm \sum_{k=0}^{6} (-1)^k w(nT) \cdot \cos[2\pi(fo - \delta f/2 + k\delta f) \cdot nT] \qquad (3)$$

it being possible to use either the two plus signs or the two minus signs.

Figure 6:
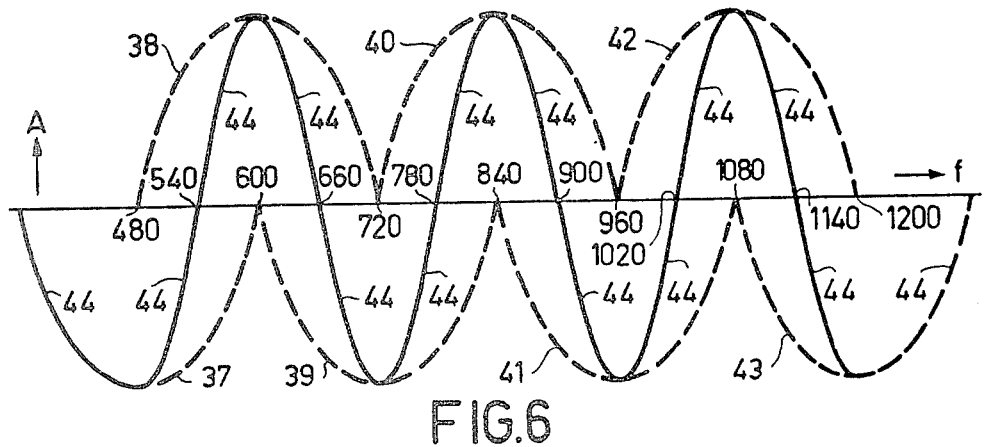
FIG. 6 shows the transfer characteristics of a comb filter used in the multi-frequency code receiver of FIG. 5.

FIG. 6 shows the result of this processing operation for the sequence of audio frequency signals of 540, 660, 780, 900, 1020 and 1140 Hz.

The broken-line curves 37 to 43, inclusive show the main lobes of the individual transfer characteristic of the DFT's for the frequencies 480, 600, 720, 840, 960, 1080 and 1200 Hz located halfway between the MFC signal frequencies.

The even lobes have a positive sign and the odd lobes have a negative sign corresponding to $(-1)^k$ and to a negative sign for the kernels (2) and (3).

For a positive sign of the kernels (2) and (3) FIG. 6 must be inverted. The curve 44 is then obtained by adding together the lobes 37 to 43, inclusive.

It will be seen that this curve has zero points for the MFC signal frequencies and is at its maximum for the frequencies located halfway between the MFC signal frequencies, so that it forms the idea transfer characteristic for the comb filter, for a number of signal samples equal to N=128. The sign of the signal values is not important as only the magnitude of the signal values is used.

In order to realize this comb filter function the multi-frequency code receiver shown in FIG. 5 has two additional memory devices, the ROM's 34 and 35, in which the samples of the kernels (2) and (3) respectively are stored. These ROM's may alternatively be in the form of a portion of the ROM's 26 and 27.

The control arrangement 25 is further of such a construction that, after determination of the MFC signal frequencies in six consecutive intervals and determination of the total received power in the subsequent interval, it instructs the RAM 23 in the then subsequent intervals in an identical manner via conductor 25-1 to read all the stored samples once again. Simultaneously, the control arrangement 25 instructs the ROM's 34 and 35 via the conductors 34-1 and 35-1 to read the samples of the kernels (2) and (3) in the same way as instruction is given in the prior art arrangement to read the arrangements 26 and 27 on determination of the MFC frequency signals.

In a corresponding manner as described for the MFC signal frequencies the sums $$S'(k'w') = \sum_{n=0}^{N} f(n',T)s(n'T, k'w') \quad (4)$$

and $$C'(k'w') = \sum_{n=0}^{N} f(n',T)r(n'T, k'w') \quad (5)$$

are determined therefrom in the product accumulators 30 and 31.

These sums (4) and (5) again form address signals for the memory device 32, which applies the associated output signal.

$$p'_r(k'w') = S'^2(k'w')^2 + C'^2(k'w')$$

to the logic circuit 33 via conductor 32-1.

This logic circuit compares this signal with a threshold which is derived from the sum of the two strongest, detected MFC signals, for example 10 dB less than the said sum, in a similar way as is described for the known guarding against interferences. If the output of the comb-frequency selective component increases to above the said threshold then the two strongest MFC signals are not applied to a code converter 36. This code converter is in the form of a ROM in which for each combination of two MFC signal frequencies the associated code sign is stored or may form part of the logic circuit 33 and thus a portion of the above-mentioned µ processor. This prevents MFC signals which are simulated by one single sinusoidal signal from being validated.

If the magnitude of the signal of the comb filter does not correspond to the sum of the two strongest detected MFC signal frequencies (for example the comb-frequency selective component does not produce the output signal and the energy detected by the MFC signal guard circuit does not exceed within the predetermined limits the detected energy of the two strongest MFC signal frequencies) then these signals are applied to the code converter 36.

The MFC signal frequencies function as address signals for the ROM 36 which in response to these address signals applies MFC code signals which correspond to the MFC signal frequencies to output 9.

The total period of time required to perform the calculations for a non-recurrent MFC signal detection is 1 millisecond, formed by eight 125 µsec intervals, namely six intervals for the MFC signals, one for the detection of the total received power and one for the detection of a single sinusoidal interfering signal. So the extra time required for the single sinusoidal signal detection is minimal and the overall MFC signal detection is effected within the detection period required by the administrations without it being necessary to increase the processing rate.

What is claimed is:

1. A method for use in a multi-frequency signal receiver for detecting in digital input signals combinations of at least two signals out of a group of multi-frequency signals and for determining by means of a comb filter whose zero points in its transfer characteristic substantially coincide with the nominal frequencies of the group of multi-frequency signals whether the receiver erroneously responds to a single frequency signal, characterized by the following steps:

sampling said digital input signals and storing a plurality of samples;

determining the discrete Fourier transform of the digital input signals having as kernels of said discrete Fourier transform the expressions:

$$\sum_{k=0}^{k=p} w(n,T) (-1)^k \sin[2\pi(fo - \delta f/2 + k\delta f) \cdot nT] \text{ and}$$

$$\sum_{k=0}^{k=p} w(n,T) (-1)^k \cos[2\pi(fo - \delta f/2 + k\delta f) \cdot nT]$$

where w(n,T) is a predetermined window signal,
p is the number of multi-frequency signals,
fo is the lowest multi-frequency signal frequency from the group of multi-frequency code signals,
δf is the frequency difference between the two frequency-consecutive multi-frequency signals,
T is the period of time between two consecutive samples of the digital input signals, and n is the number of the samples of the input signals:
determining from the discrete Fourier transformed input signals a signal which is proportional to the power of the selected frequency component;
comparing said proportional signal with the sum of the powers of the multi-frequency signals of a detected multi-frequency code signal combination;
and invalidating the detected multi-frequency code signal combination when said proportional signal has a value which exceeds a threshold value dependent on the value of the said sum.

* * * * *